UNITED STATES PATENT OFFICE.

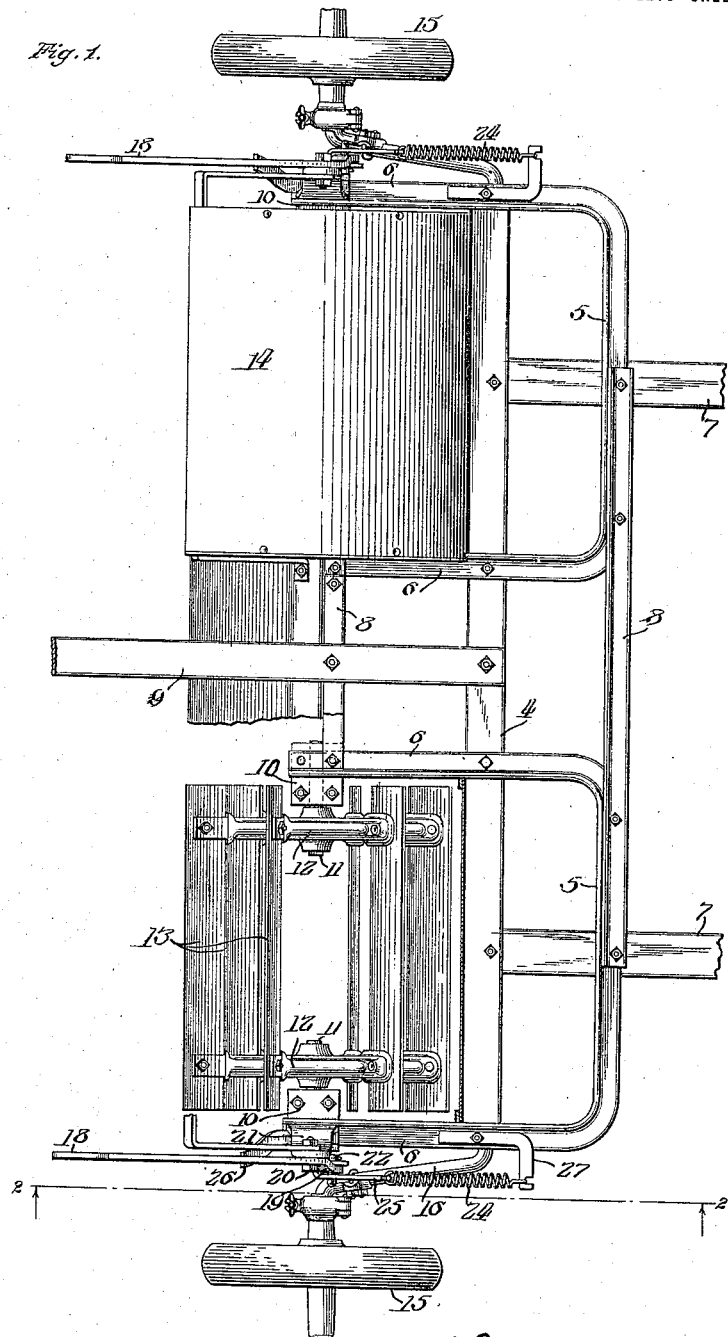

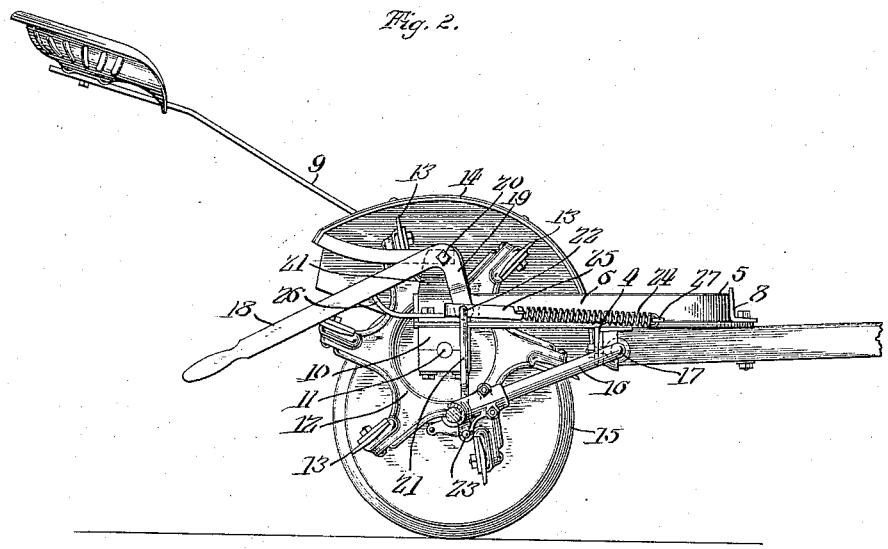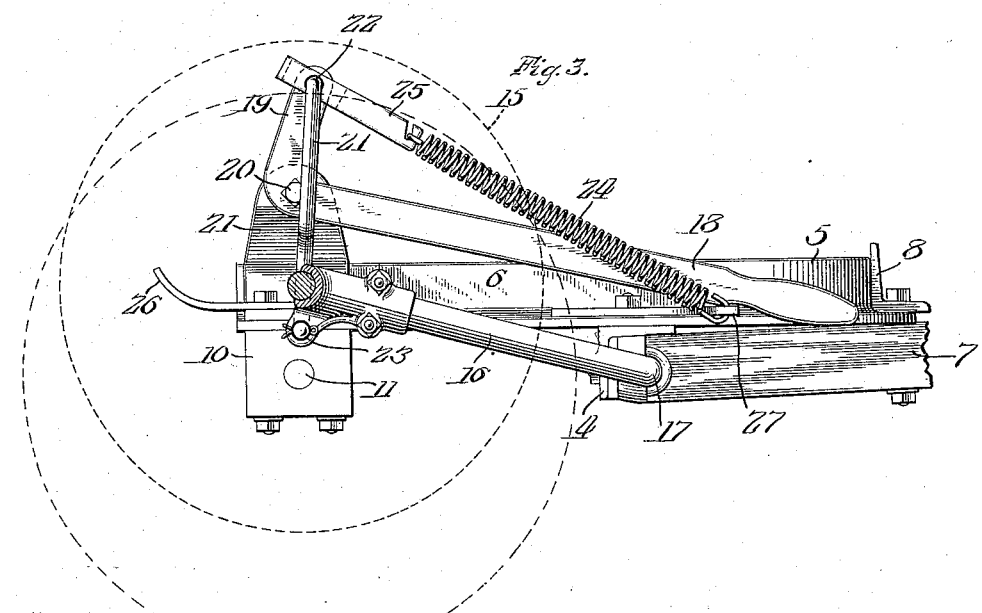

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

STALK-CUTTER.

1,150,236.        Specification of Letters Patent.      Patented Aug. 17, 1915.

Application filed April 17, 1914. Serial No. 832,571.

*To all whom it may concern:*

Be it known that I, LEWIS E. WATERMAN, a citizen of the United States, residing at Rockford, in the county of Winnebago and the State of Illinois, have invented certain new and useful Improvements in Stalk-Cutters, of which the following is a specification.

This invention relates to agricultural implements known as "stalk cutters".

It is an object of my invention to construct an improved stalk cutting implement in which is mounted upon and relatively fixed to a frame which carries the operator, one or more rotary wheel-like cutters; and further, provide carrying wheels for said frame movable vertically relative thereto to carry when they are in a lowered position the cutters elevated above the ground and when they are in a raised position to allow the cutters to rest upon the ground and in themselves carry the frame and operator.

A further object is to provide a novel means for raising and lowering the carrying wheels relative to the frame, and such means that will be locked automatically in position when moved to either their raised or lowered position.

In the accompanying drawings, Figure 1 is a plan view of my improved stalk cutter, one of the cutter guards being removed to illustrate the mounting of the cutter upon the frame. Fig. 2 is a side elevational view of the stalk cutter as taken on the line 2—2 of Fig. 1, the carrying wheels being shown lowered whereby the cutters are in an inoperative position. Fig. 3 is an enlarged view of the near side of the implement shown in Fig. 2, the wheels being in a raised position and the wheels and cutters being shown diagrammatically.

A frame is formed by a cross-bar 4 having two U-sections 5 fixedly attached thereto and being spaced apart with their arms 6 extending in the direction of travel of the frame, tongues 7 attached to members 4 and 5, and brace-bars 8 connecting the two U-sections. At the rear end of each arm 6 is fixedly attached a journal bearing 10, in each of which is journaled a stub axle 11, and mounted upon each axle is a wheel-like cutter frame 12, the spoke-like members of the frames of each U-section being connected by cutter blades 13. The cutters are covered by guards 14 for protective purposes.

There is a single carrying wheel 15 at each end of the frame, the wheels being movable vertically relative thereto and each by a separate mechanism separately operated; and since these mechanisms are alike in structure and operation I will describe but one of them specifically. A crank-arm 16 has one angled end thereof forming the axle of the wheel 14 and its other end pivotally connected to the frame at 17 in such a manner that the wheel lies opposite the outer end of a cutter and is swingable upon pivot 17 vertically relative to the frame and cutter. A bell-crank lever having a relatively long handle-arm 18 and a short arm 19 is pivoted at 20 on a horizontal cross-frame axis to a bracket 21 fixedly attached to the end of an outer arm 6, the axis of pivot 20 and of the axle of wheel 14 being substantially in a common vertical plane. A link 21 is connected pivotally at one end to the end of the bell-crank arm 19 and at its other end at 23 to a bracket on the axle end of the crank arm 16, the link being disposed on the outer side of the bell-crank, whereby upon swinging the bell-crank the wheel will be moved vertically. As shown in Fig. 2 the bell-crank is in a position with the wheel 15 lowered, and the link 21 and arm 19 being substantially in alinement a coiled spring 24 connected at one end to the frame and at its other end to a member 25 pivotally mounted on the end 22 of link 21 exerts tension on said link and arm to move the joint 22 forward of a line connecting the pivots 20 and 23, whereupon the weight of the frame and cutter which is gravitated from pivot 20 would swing the pivot 22 causing the frame to drop but for the stop 26 which is contacted by the handle 18, thereby forming a toggle lock through the members 18, 19 and 21 and maintaining the cutter and frame elevated and the implement in an inoperative working but a riding position.

To raise the carrying-wheel and lower the cutter to the ground the handle 18 would be swung forward of the machine until its outer end rested upon and was stopped by the frame member 27, such position being shown in Fig. 3; and in this position the pivot 22 will have moved forward of a line connecting the centers 20 and 23 thereby establishing a toggle lock, since the weight of the wheel will hold the lock. The spring 24 also holds the lever 18 from being displaced by vibration of the implement, thus preventing the toggle from breaking.

It will be noticed that both operative positions of the several parts are maintained locked respectively by a common mechanism which locks in a toggle at each position, and that the spring 24 coöperates substantially in effecting and maintaining these locks.

When the machine is in operative position, the wheels raised as in Fig. 1, the cutters rest and roll upon the ground when the frame is drawn, the blades of the cutters effecting the cutting of the stalks, the stalks being drawn into the path of the cutters by hooks (not shown) located in advance of the cutters, as is well understood in the art.

It will be noted that by the cutters resting directly upon the ground and carrying the combined weight of the frame, wheels and operator, very efficient cutting may be assured; and considering also the nature of the work of this implement, the incessant vibration set up, it will be seen that the cutters are very sturdily mounted by being direct with the frame, and the structure withal combining also the locking features of the wheels is rendered very substantial and efficient for its use.

I claim as my invention:

1. The combination of a frame, a crank-arm pivoted at one end to the frame on a horizontal axis so that its free end is swingable vertically with respect to the frame, a carrying-wheel mounted on said free end of the crank-arm, a lever pivoted to the frame, and a connection between the lever and said crank-arm, said lever being pivotal to swing the crank-arm vertically to predetermined raised and lowered positions, the lever and its connection with the crank-arm being so arranged and constructed that by operation of the lever to move the carrying wheel to both of said positions, the carrying-wheel will be automatically locked therein.

2. The combination of a frame, a crank-arm pivoted to the frame on a horizontal axis so that its free end is swingable vertically with respect to the frame, a carrying-wheel mounted on said free end of the crank-arm, and means for swinging said arm vertically to move said wheel to predetermined raised and lowered positions, and a single locking means for automatically locking the crank-arm in both of said positions, said locking means including a spring so arranged as to hold the said means from being displaced from its locking positions.

3. In an agricultural implement, the combination with a frame, of a carrying-wheel therefor movable vertically relatively thereto, an arm pivoted to a frame member, a link pivoted at one end to the arm and at its opposite end to a carrying-wheel member, said arm frame-pivot and link wheel-pivot being spaced apart vertically in a substantially vertical plane, the wheel being movable vertically by rocking of said arm and said arm being rockable to carry its link pivot above and below its frame pivot thereby to effect a raised and lowered position of the carrying-wheel, and means for limiting rocking movement of said arm when its link pivot is out of alinement with the said vertical plane pivots.

4. In an agricultural implement, the combination with a frame, of a carrying-wheel therefor movable vertically relatively thereto, an arm pivoted to a frame member, a link pivoted at one end to the arm and at its opposite end to a carrying-wheel member, said arm frame-pivot and link wheel-pivot being spaced apart vertically in a substantially vertical plane, the wheel being movable vertically by rocking of said arm and said arm being rockable to carry its link pivot above and below its frame pivot thereby to effect a raised and lowered position of the carrying wheel, means for limiting rocking movement of said arm when its link pivot is out of alinement with the said vertical plane pivots, in both the said raised and lowered positions and at a common side of said pivots, and means for yieldingly holding said arm link-pivot out of said alinement.

5. In an agricultural implement, the combination with a frame and a carrying-wheel crank pivotally connected thereto with its wheel end swingable vertically, of a single toggle lock connection between the frame and said crank, for locking the crank in both raised and lowered positions.

6. In an agricultural implement, the combination with a frame and a carrying-wheel crank pivotally connected thereto with its wheel end swingable vertically, of a bell-crank pivoted to the frame, a single toggle connection between the frame and crank including one of the arms of said bell-crank, said connection being toggled to maintain the crank in both raised and lowered set positions with respect to the frame.

7. The combination of a frame, carrying-wheels movable vertically with respect thereto, a ground engaging device mounted on the frame, and means for raising the carrying-wheels with respect to the frame to a position wherein said ground-engaging means will rest on the ground and the wheels will be held elevated above the ground, and vice versa, said means including a device for automatically locking the wheels in raised and lowered positions upon the wheels being moved to the same, the locking being effected by the weight of the wheels when the same are elevated and by the weight of the ground engaging means and the frame when the wheels are lowered.

8. The combination of a frame, carrying-wheels movable vertically with respect thereto, and means for raising and lowering the carrying-wheels with respect to the frame, said means including a single toggle-lock so arranged that the wheels will be automatically locked in both raised and lowered positions upon being moved to the same.

9. The combination of a frame, carrying wheels mounted thereon to move vertically with respect thereto, means for toggle-locking the wheels in both raised and lowered positions upon the wheels being moved to the same, and means for resiliently holding the said toggle-locking means in their locking positions.

10. In an agricultural implement, the combination of a frame, a carrying-wheel crank pivotally connected thereto with its wheel end swingable vertically, a single toggle-lock connection between the frame and said crank for locking the crank in both raised and lowered positions, and a spring connected with said toggle-lock connection for holding the same in both of its said locking positions.

In testimony whereof I have hereunto set my hand in presence of two subscribing witnesses.

LEWIS E. WATERMAN.

Witnesses:
N. F. LEVINGS,
R. A. HEMENWAY.

Copies of this patent may be obtained for five cents each, by addressing the "Commissioner of Patents, Washington, D. C."